July 30, 1935.  J. H. JAMES  2,009,664
METHOD OF TWO-STEP OXIDATION OF HYDROCARBONS
Filed Dec. 23, 1932
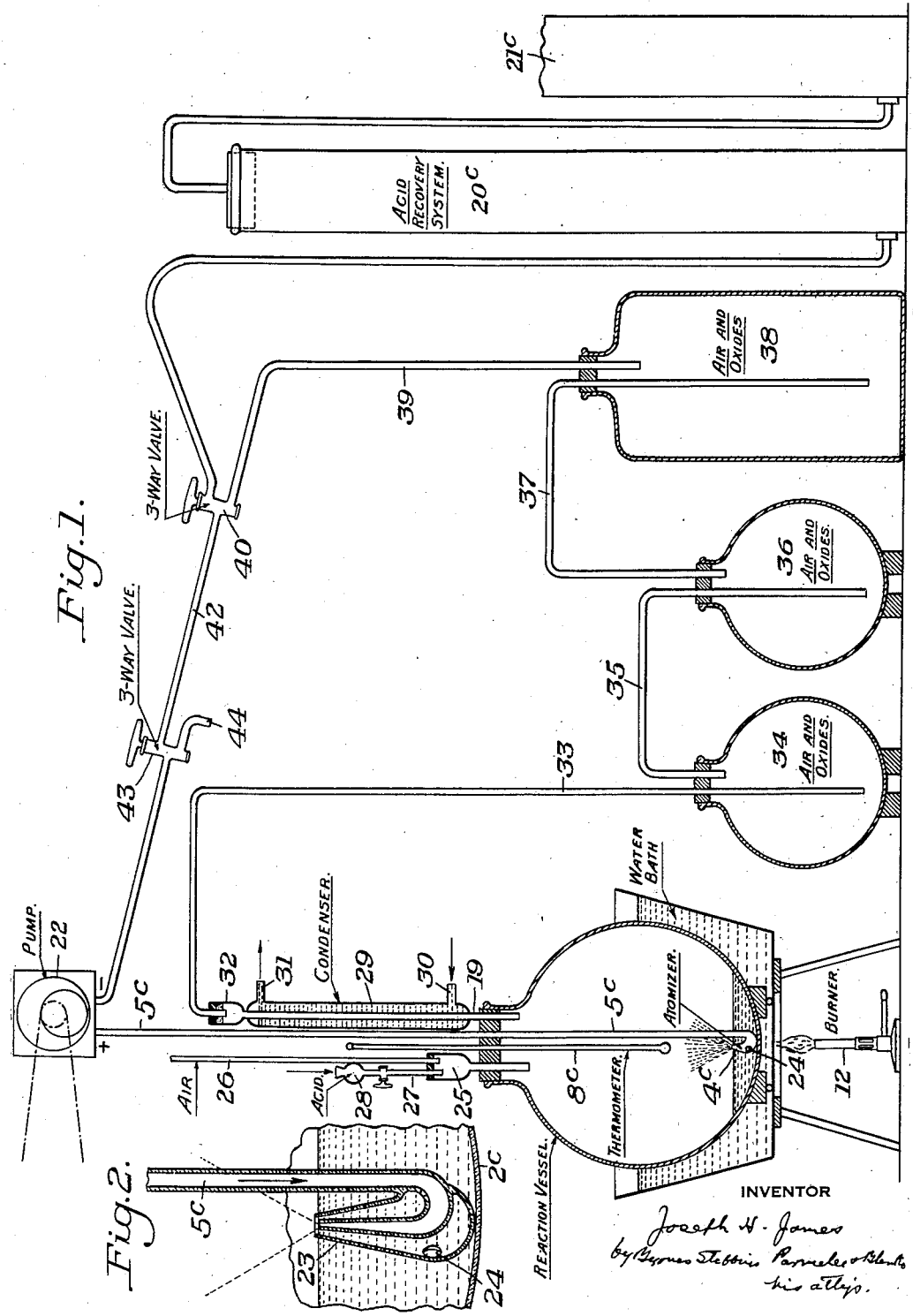
INVENTOR
Joseph H. James
by Byrnes Stebbins Parmelee & Blenko
his attys.

Patented July 30, 1935

2,009,664

UNITED STATES PATENT OFFICE 2,009,664

METHOD OF TWO-STEP OXIDATION OF HYDROCARBONS

Joseph Hidy James, Pittsburgh, Pa., assignor to Clarence P. Byrnes, Sewickley, Pa., trustee Application December 23, 1932, Serial No. 648,659

21 Claims. (Cl. 260—116)

Reference is had to the accompanying drawing forming part of this specification in which:

Figure 1 is a diagrammatic side elevation showing one form of apparatus for carrying out the second step of partial oxidation; and Figure 2 is a detail view of the atomizing device.

My invention relates to the partial oxidation of hydrocarbons and is designed to obviate or reduce certain disadvantages in vapor phase air oxidation with or without a catalyst. It may be applied to any hydrocarbons, but has been found of particular advantage in aliphatic hydrocarbons or those containing a large percentage thereof, as well as in naphthenic hydrocarbons, cycle hydrocarbons, etc.

In vigorously attacking such hydrocarbons by the vapor phase air or oxygen process, such as set forth for example in my Reissue Patent No. 18,522 of July 12, 1932; my copending application Ser. No. 435,355, filed January 6, 1921, etc., ill smelling unsaturated compounds are apt to be formed by reason of dehydrogenation and thermal decomposition or cracking of the oxidized bodies under the temperatures normally used therein.

On the other hand, in a low temperature oxidation process, such as set forth in my copending applications, Ser. No. 588,544, filed January 25, 1932, and Ser. No. 627,178, filed August 1, 1932, where oxidation is carried out by an oxygen-containing gas in the presence of nitric acid or oxides of nitrogen reacting on the hydrocarbon in finely divided condition, the temperatures are relatively low and often below 100 to 125° C. This low temperature method obviates or reduces the ill smelling compounds, but on the other hand is a much slower method. The time of a run may extend into many hours even with the hydrocarbon in a fine degree of subdivision.

I have discovered that I may combine these processes and obtain to a large degree the advantages of both, while greatly reducing or eliminating disadvantages of each process by itself.

In the preferred form, I first treat the hydrocarbon, usually a petroleum fraction, by subjecting it to vapor phase catalytic air oxidation, the oil being vaporized, mixed with air and passed through a reaction zone, preferably in the presence of catalyst, at a temperature below that of continuous self-sustained combustion and within the reactive range, as set forth in my patents and above recited application Ser. No. 435,355.

In carrying out this process, I preferably attack the oil more mildly than usual, as for example, by using a lower temperature, by using a less active catalyst, etc. The product is then condensed and the resulting oily mixture is further oxidized by treating it with my low temperature air oxidation method, the partly oxidized oil being finely divided and treated with air or an oxygen-containing gas which also contains oxides of nitrogen or nitric acid.

Figure 1 shows diagrammatically one form of apparatus for carrying out this second oxidation step in cyclic form. In this form 2c is a closed Pyrex glass container having a stopper or closure through which extends a compressed air tube 5c terminating in an atomizer or nebulizer 4c within the lower part of the container. This atomizer projects upwardly, and the tube 5c is connected to the plus or ejection side of a pump or forcing device indicated at 22. The atomizer nozzle shown in Figure 4 is surrounded by a larger glass tube 23 reduced at the jet and having a liquid inlet 24 in its side. The vessel 2c is shown as set on a cork ring having a central hole, this ring resting on ordinary clay triangles which, in turn, rest on the bottom of a metallic receptacle containing a water bath. The numeral 12 is a burner by which the water is preferably brought to a temperature of above 50° C. before the liquids and air are admitted. After this temperature is reached, the burner is usually turned down and regulated so that, including the heat of reaction, the vessel will be maintained at an approximately constant temperature. There is a cooling effect through radiation; and if the burner is supplying heat, there is some heat supplied to the water, but as near a balance as possible is obtained to maintain uniform temperature conditions within the receptacle 2c. The vessel is preferably maintained at a temperature above the dew point, so that the deposition of drops of dew thereon is avoided as far as possible.

A glass receptacle 25 has a tube leading through the stopper of vessel 2c and into the stopper of this receptacle 25 extends a valved air pipe 26 and a valved glass tube 27 leading from an acid reservoir 28. By this means, additional acid or oxides of nitrogen may be fed into the system, as well as additional air, both these pipes being valved and the feed being thus regulated if either or both are used. The hydraulic head on the acid enables it to enter along with the air under pressure through pipe 26.

The number 8c is a thermometer to determine the temperature within the reaction vessel. The outlet pipe 19 enters the atmosphere of the reaction chamber, passes through a condenser 29, cooled by the water jacket surrounding the pipe, the jacket having inlet and outlet pipes 30 and 31; and the upper part of this pipe 19 is enlarged at 32 and contains a layer of foraminous material such as glass wool on fine wire mesh. From this enlarged portion, the tube 33 leads down into the bottom portion of vessel 34, from which tube 35 leads to the bottom of vessel 36, from which pipe 37 leads to the bottom of vessel 38, from which tube 39 leads to a three-way valve 40. One passage of this valve opens to the pipe 41, which leads to the nitric acid recovery system 20, 21; while another port leads to a pipe 42 extending through three-way valve 43, to the minus or intake side of the pump or forcing device 22. The three-way valve 43 has a passage through a port 44 to which a gas-sampling tube may be temporarily attached, thus obtaining samples of the atmosphere in this circulating system.

In using the apparatus, a given quantity of oil and nitric acid is charged into the reaction flask. The air enclosed therein supplies oxygen for regenerating the partially spent nitric acid or oxides, and this amount of air is increased by the air in vessels 34, 36 and 38, which vessels may, of course, be extended to any desirable number or size. With the liquid fed in and the parts in place, the pump drives air and then the atmosphere down into the atomizer, where the liquid lies just above the inner tip thereof, the mixed liquids are driven up into the atmosphere of the flask and atomized and nebulized; the atmosphere above being drawn through the condenser 29 to the vessels 34, 36 and 38, thence to the pump or forcing device, and thence again down into the air tube of the atomizer. The filtering action of the strainer just above the condenser catches any entrained liquids and holds them back from reaching the pump inlet. The oil and oxides and acid running to the bottom of the reaction chamber are caught up continuously by the atomizing jet and driven into the atmosphere of the reaction chamber. In this connection, all the air in the connecting system is utilized in regenerating the oxides and supplying air to raise their oxidation and enable them to be re-used in oxidizing the oil. When the amount of oxygen in the system has been lowered sufficiently, the valve 43 may be closed to pipe 42, the valve 40 may be turned into communication with the nitric recovery system, fresh air is admitted for "purging" through inlet 44 of valve 43, and the oxides of nitrogen and the partially deoxygenated air are forced into the nitric recovery towers, together with fresh air entering at 44 if this valve is open to the atmosphere. In the recovery system, by supplying fresh air and a proper amount of water, the usual nitric acid recovery process is carried out.

Instead of the intermittent purging method of operation just described, it is preferable in some cases to continuously tap out a certain proportion, for example, one-fortieth, of the total volume of the gases in circulation, and to make up this loss by the continued admission of air through pipe 26, and by admission of acid through pipe 27, sufficient to keep the reaction temperature under practically constant conditions. This will give a cyclic operation with a continuous feed of oxides and air until the reactions are carried to the desired point. In this case, valve 40 would be opened to pipes 41, 39 and 42.

This cyclic method involves the circulation of the air and nitrogen oxides through a pump or circulating device, the discharge pressure of the gases serving to re-atomize the oil and liquid acid collecting continuously in the bottom of the reacting chamber. As the oxygen of the air in circulation is exhausted by the re-oxidation of the nitrous oxide and lower oxides, it is desirable to renew the air after that in the system has been exhausted. This may be done by carrying on the operation until the oxygen has been reduced to a low figure, and then admitting fresh air and sweeping out all the gases into the nitric acid recovery system. This is called "purging". Instead of this intermittent admission of fresh air, I may continuously admit a limited quantity of fresh air and nitric acid, discharging continuously a like volume of spent air and nitrogen oxides into the nitrogen regenerator recovery system.

In using such a continuous method, the valve 40 will be turned to a position where it discharges at least a part of the gas vapor mixture into the nitric acid recovery system, shown at 20, 21. In such case, by using a reaction chamber 2c having a valved outlet in its bottom portion, I may withdraw any undesirable portion of the liquid collecting in the bottom of receptacle 2c to keep this liquid at the proper level therein. The liquid drawn off may then be retreated, if desired, in a second vessel. This drawing off may be continuous or intermittent.

In the treatment of the previously partially oxidized oil by the above process, the acid content is greatly increased and a more desirable product produced, both as to color and odor, than in my vapor phase air oxidation catalytic process. At the same time, the desired oxidation effect is obtained much more rapidly than where the nitric acid air method is applied directly to unoxidized hydrocarbons.

It will be understood that this latter method, involving the air oxidation of finely divided partially oxidized oil mixtures in the presence of nitric acid or oxides of nitrogen, may be applied to any partly oxidized oils, whether oxidized in the vapor or liquid phase or both.

The following example illustrates the application of the low temperature air and oxide of nitrogen method applied to a vapor phase catalytic oxidation product.

The partly oxidized product was obtained by the usual vapor phase catalytic air oxidation process in a commercial unit using a plurality of successive catalytic screens containing, for example, non-volatile molybdenum oxides or molybdenum compounds, air being introduced into the original vapor and also between the screens with a temperature of about 400 to 410° C. at the screens and about 350° C. in the cooled mixture between the screens. The product was condensed and the oily mixture, which is substantially non-soluble in water, had a specific gravity of .85 at 60° F. The saponification number was 19.7 milligrams K O H per gram. The acid number was 8.51 milligrams K O H per gram. The volume percentage of saponifiable matter was about 22.5%. This product was then finely divided by atomization or nebulization and treatment with air and nitric acid or oxides of nitrogen in the general manner above described, this process being applied for about three and a half hours. For every liter of oxidized oil, twenty-two liters of air per minute were blown through, with a nitric acid addition to the air stream of 70 cc. of 70% acid per hour. The temperature varied between the limits of 92° and 102° C., the average being about 100° C.

The product was viscous and nearly semi-solid at room temperature. The color was approximately the same as that of the product from the first oxidation, namely, a pale brown. There was a sweetish odor with little or none of the rank character of the original catalytically oxidized kerosene. The saponifiable number was raised to about 252.8 milligrams K O H per gram. The acid number was raised to about 131.94 milligrams K O H per gram, and the volume percentage of saponifiable matter was raised to about 74%.

This second oxidation step will take place at a temperature below 250° C. and also below 200° C., as well as below 150° C.; and I preferably employ a temperature below 100° C., at or near ordinary room temperature. The oxides used in the second oxidation step may include oxides of nitrogen, chromium, manganese, sulphur, etc., as well as of corresponding acids, nitric acid, chromic acid, manganic acid and similar equivalent acids. The relative volume of oxides of acid may extend to even a greater proportion of acid than the hydrocarbon treated. The amount of air or other oxygen-containing gas present may be varied, but is preferably beyond the theoretical amount. That is, the free oxygen is preferably more than that required for the continuous regeneration of the oxides as they shift from higher to lower oxides and vice versa. The percentage of acid by volume may vary from a relatively low figure of, say, 2½ to 3%, up to a percentage greater than that of the hydrocarbon by volume.

To increase the yield of oxidized bodies, I may use a series of oxidizers and carry out the reactions in successive steps therein either on the same batch or on a continuous feed. In such case, additional oxygen-containing gas such as air, and additional oxides such as oxides of nitrogen, may be supplied between any or all of the successive oxidizers following the first; and fresh hydrocarbon mixture in nebulized or atomized form or in vapor or gas phase may be additionally supplied between successive reaction chambers, in which case, collection or condensation of products may be effected between any and all of such successive reactions and in each case, before addition of the reacting materials or any of them, or after the last reaction.

In all cases, the oxides or acids or both may be in the form of a mist or vapor and the air or oxygen-containing gas will cause the regeneration of the oxides to form higher oxides or acids, which then again enter into the reaction and become lower oxides. In all cases, especially where a relatively large percentage of oxides or acid is used, I prefer to employ a nitric acid recovery system into which the atmosphere of the reaction chambers is exhausted, the oxides therein being regenerated into acids by the action of water spray and air as in ordinary nitric acid manufacture, for example, from ammonia oxidation.

A large percentage of the oxides or acids or both may be collected in the reaction chamber or chambers or in chambers communicating therewith. If the reaction chamber is in the form of a closed vessel or communicates with a closed chamber, the oily layer will collect on the layer of nitric or other acid and water, and the layers may be separated by decantation. This will usually give a recovery of the major part of the acid used, while a large part of the remainder may be recovered and converted into nitric acid, as above set forth, in the nitric acid recovery system connected to the outlet or outlets from the apparatus.

The hydrocarbons may be of low molecular weight and may be partly or entirely vaporized in the mixture or in the reaction chamber.

In the case of heavy hydrocarbons, I prefer to employ a mist or fog of the heavy hydrocarbons in connection with a mist of nitric acid or vapor or mist and vapor with oxides of nitrogen and air or oxygen-containing gas.

With lower molecular weight hydrocarbons, I prefer to employ a mist or vapor thereof or a mist and vapor thereof, in connection with a mist of nitric acid or nitric acid vapor or nitric acid mist and vapor with oxides of nitrogen and air or oxygen-containing gas.

It is of advantage particularly as to color, odor and purity of product, to carry out my process at the lowest possible temperature compatible with a proper percentage of oxidized product. The products may and usually do extend from alcohols through aldehydes, esters, ethers, etc. to organic acids (partly lactonic). It is possible to carry out the reactions in accord with my process at temperatures below 100° C.

The reaction chamber is preferably kept at a temperature above the dew point, since if below that point, it would cause collection of liquid film on its interior. The amount of air is preferably such that free oxygen is present in the exit gas. The volume of oxygen may be above or below the theoretical amount for formation of the compounds desired through the intermediary of the oxides, but is preferably above that volume.

The reaction vessel is preferably maintained as nearly as possible at a constant temperature by cooling or heating means or by both. For example, the reaction chamber may have a surrounding counterflow system whereby the entering mixture passes over the chamber before entering; or it may be surrounded by cooling jackets in which either liquid or gaseous fluids are used. The heat of reaction will depend upon the particular raw material used, the oxides used, the amount of air, etc.; and I find that in this process, the heavier the hydrocarbon, the easier it is to oxidize the same, and the lower the temperature needed. For heavier hydrocarbons, which are normally liquid, the reaction chamber or chambers may be kept at a temperature below 100° C. and near room temperature by any well known chemical engineering means, such as a water bath, a mercury boiler sytem, etc. In treating the lighter hydrocarbons, cooling may be used instead of heating, especially after the reaction had begun. These oxidizing reactions give out heat and, depending on the above factors, together with heat losses by radiation, etc., heating or cooling means or both may be needed to maintain the temperature at a substantially uniform point during the carrying on of the process.

The advantages of my invention result from the better character of the product and the reduction in the time of the process over that of the air and nitric acid or nitric oxide process.

By "finely divided" in my claims, I intend to include hydrocarbon in fume or gas phase, as well as in fine spray, drops or mist.

In using the process, other methods of preliminary oxidation may first be used, although I prefer to first use the catalytic air oxidation process at higher temperature, followed by the lower temperature air and nitric oxide or nitric acid process.

The word "hydrocarbon" is used herein to include either bodies containing only hydrocarbon and carbon alone or containing only hydrogen, carbon and oxygen in the molecules. The air oxidation with oxides, such as oxides of nitrogen may be made more rapid and efficient by carrying it on under superatmospheric pressure, preferably under high pressure. Here again the hydrocarbon is acted upon in finely divided condition, and preferably within a pressure bomb or pressure vessel adapted to withstand high pressures. In such case, the hydrocarbon or partially oxidized hydrocarbons will be fed into the vessel with dilute nitric acid (preferably under 20% acid solution) and the hydrocarbon will lie above and upon the dilute acid layer. The cap or closure of the bomb or pressure vessel is provided with two pipes, one leading from an air compressor to near the bottom of the vessel through which compressed air enters the liquid layers and ends in the dilute acid layer; while the outlet pipe is provided with a valve controlling the exit of excess oxygen and nitrogen from the upper part of the pressure vessel. In the use of this process, the turbulence is produced by the stirring action of the air entering under pressure which drives the mixture up into the space within the vessel above the layers, giving intimate reactive contact, and hence reducing the cost of the process as well as speeding it up. The chemical actions in the vessel may be represented, in my opinion, by the following reactions resulting from the oxides of nitrogen giving up oxygen to the hydrocarbon or partly oxidized hydrocarbon.

(1) $HNO_3 \rightarrow HNO_2 + O$ (attacks the organic matter)
(2) $2HNO_2 \rightarrow H_2O + NO + NO_2$
(3) $2NO + O_2 \rightarrow 2NO_2$
(4) $2NO_2 + H_2O \rightarrow HNO_3 + HNO_2$ The $HNO_3$ reacts in Equation (1) and the $HNO_2$ as in Equation (2).

In this case by keeping sufficient oxygen concentration (air under pressure), the nitric oxides are kept continually in the pressure vessel, the cycle being probably that shown in the above equations. Only the nitrogen and excess oxygen escape through the valved outlet pipe under the high pressure obtaining.

This high pressure method with spraying or the atomizing action on the liquids enables the partial oxidation to be carried out more rapidly and efficiently and at temperatures such as above recited, and preferably below 100° C., on either straight hydrocarbons or partially oxidized hydrocarbons or on mixtures containing carbon, hydrogen and oxygen. It will be understood that some of my claims are drawn to cover this pressure method with oxides, such as oxide of nitrogen or equivalent oxides, whether the first step of previous partial oxidation is carried out or not upon the material to be oxidized under this pressure treatment.

The proportions of oxides of nitrogen or nitric acid to the raw material being treated may be varied in this case within ranges such as above recited. Pressures may be used within a range up to several thousand pounds per square inch.

Many variations may be made in the form of apparatus employed in either case and in the case of the air oxidation alone, and the process may be carried out either in a liquid or vapor phase, or the two combined.

I do not claim herein certain special features of the process disclosed as the same are covered in another copending application disclosing said features. This application is intended to include the broader claims to the process common to both applications.

I claim:

1. In the partial oxidation of hydrocarbons, the steps consisting of subjecting a normally liquid hydrocarbon while in vapor phase to a free-oxygen-containing gas, condensing the oxidized product, and then subjecting an oily portion of the product in liquid phase to free-oxygen-containing gas at a pressure of over 15 pounds above atmosphere.

2. In the partial oxidation of hydrocarbons, the steps consisting of subjecting a normally liquid hydrocarbon while in vapor phase to a free-oxygen-containing gas in the presence of a catalyst and condensing the oxidized product, and then subjecting an oily portion of the product in liquid phase to free-oxygen-containing gas at a pressure of over 15 pounds above atmosphere.

3. In the partial oxidation of hydrocarbons, the steps consisting of subjecting a normally liquid fraction of mineral oil in vapor phase to free-oxygen-containing gas under reactive conditions, and then subjecting at least part of the product in liquid form and in finely divided condition to a free-oxygen-containing gas.

4. In the partial oxidation of hydrocarbons, the steps consisting of subjecting a normally liquid hydrocarbon while in vapor phase to a free-oxygen-containing gas, condensing the oxidized product, and then subjecting an oily portion of the product in finely divided liquid form to free-oxygen-containing gas together with finely divided oxides.

5. In the partial oxidation of hydrocarbons, the steps consisting of subjecting a normally liquid fraction of mineral oil in vapor phase to free-oxygen-containing gas at a relatively higher temperature under reactive conditions, and then subjecting at least part of the product in liquid form and under a pressure of at least 15 pounds above atmosphere and at relatively lower temperature to a free-oxygen-containig gas, together with finely divided oxides under reactive conditions.

6. In the treatment of an oily liquid partial oxidation product containing oxygen derivatives of hydrocarbons of different molecular weights, the steps consisting of finely dividing the mixture, and treating the same in liquid phase and under a pressure of at least 15 pounds above atmosphere with a free-oxygen-containing gas at a temperature below 400° C.

7. In the treatment of an oily liquid partial oxidation product containing oxygen derivatives of hydrocarbons of different molecular weights, the steps consisting of finely dividing the mixture, and treating the same in liquid phase with a free-oxygen-containing gas at a temperature below 400° C. under superatmospheric pressure.

8. In the partial oxidation of hydrocarbons, the steps consisting of subjecting a normally liquid hydrocarbon while in vapor phase to a free-oxygen-containing gas under relatively higher temperature, condensing the oxidized product, and then subjecting an oily portion of the product in liquid phase to free-ozygen-containing gas at a relatively lower temperature and under superatmospheric pressure.

9. In the partial oxidation of hydrocarbons, the steps consisting of subjecting a normally liquid hydrocarbon to partial oxidation in a plurality of steps, in one of which the hydrocarbon in vapor phase is subjected to a free-oxygen-containing gas under reactive conditions and in another of which while in finely divided liquid form it is subjected to a free-oxygen-containing gas together with finely divided oxides in fluid state under reactive conditions and under a pressure of at least 15 pounds above atmosphere.

10. In the partial oxidation of hydrocarbons, the steps consisting of subjecting a normally liquid hydrocarbon while in the vapor phase to a free-oxygen-containing gas under reactive conditions, and then subjecting at least part of the product in finely divided liquid form to a free-oxygen-containing gas together with finely divided oxides in fluid state under reactive conditions and under a pressure of at least 15 pounds above atmosphere.

11. In the partial oxidation of hydrocarbons, the steps consisting of subjecting a normally liquid hydrocarbon while in the vapor phase to a free-oxygen-containing gas under reactive conditions, and then subjecting at least part of the product in finely divided liquid form to a free-oxygen-containing gas together with finely divided oxides in fluid state under reactive conditions at a pressure of at least 15 pounds above atmosphere and at a lower temperature than in the vapor phase treatment.

12. In the partial oxidation of hydrocarbons, the steps consisting of subjecting a normally liquid hydrocarbon while in the vapor phase to a free-oxygen-containing gas in the presence of a catalyst under reactive conditions, and then subjecting at least part of the product in finely divided liquid form to a free-oxygen-containing gas together with finely divided oxides in fluid state under reactive conditions at a pressure of at least 15 pounds above atmosphere.

13. In the partial oxidation of hydrocarbons, the steps consisting of subjecting a normally liquid non-aromatic hydrocarbon to partial oxidation in a plurality of steps, in one of which the hydrocarbon in vapor phase is subjected to a free-oxygen-containing gas under reactive conditions, and in another of which while in finely divided liquid form it is subjected to a free-oxygen-containing gas together with finely divided oxides in fluid state under reactive conditions.

14. In the partial oxidation of hydrocarbons, the steps consisting of partially oxidizing hydrocarbon containing a material proportion of aliphatic hydrocarbon at a relatively higher temperature and then further oxidizing a product thereof at a lower temperature by free oxygen under superatmospheric pressure.

15. In the method of improving a condensed product of vapor phase oxidation of a mineral oil fraction, the step consisting of subjecting the same to the action of a gas containing free oxygen while in liquid phase under superatmospheric pressure.

16. In the partial oxidation of hydrocarbons, the steps consisting of partially oxidizing hydrocarbon containing a material proportion of aliphatic hydrocarbon in vapor or gaseous phase in the presence of a catalyst, condensing the product, and then further oxidizing at least a portion of it in liquid phase by free oxygen while under superatmospheric pressure.

17. In the method of improving a condensed product of vapor phase oxidation of a mineral oil fraction, the step consisting of subjecting the same to the action of a gas containing free oxygen while in liquid phase under superatmospheric pressure of over three atmospheres.

18. In the partial oxidation of hydrocarbons, the steps consisting of partially oxidizing hydrocarbon containing a material proportion of aliphatic hydrocarbon at a relatively higher temperature, fractioning the product, and then further oxidizing a fraction of the product at a lower temperature by free oxygen under superatmospheric pressure.

19. In the method of improving a fraction of the condensed product of vapor phase oxidation of mineral oil, the step consisting of subjecting said fraction to the action of a gas containing free oxygen while in liquid phase under superatmospheric pressure.

20. In the partial oxidation of hydrocarbons, the steps consisting of partially oxidizing hydrocarbon containing a material proportion of aliphatic hydrocarbon at a relatively higher temperature, and then further oxidizing a product thereof at a lower temperature by free oxygen under superatmospheric pressure in the presence of an accelerator.

21. In the partial oxidation of hydrocarbons, the steps consisting of subjecting a normally liquid hydrocarbon containing a material proportion of aromatic hydrocarbon while in vapor phase to a free-oxygen-containing gas under relatively higher temperature, condensing the oxidized product, and then subjecting an oily portion of the product in liquid phase to free oxygen-containing-gas at a relatively lower temperature and under superatmospheric pressure.

JOSEPH HIDY JAMES.